US012685350B2

(12) United States Patent
Pascua

(10) Patent No.: US 12,685,350 B2
(45) Date of Patent: Jul. 21, 2026

(54) MULTI-GENRE HEAD ARMOR WITH DUAL COIL SHOCK SUSPENSION AND BUCKWHEAT HULL SHOCK ABSORBERS

(71) Applicant: Bridget Pascua, Las Vegas, NV (US)

(72) Inventor: Bridget Pascua, Las Vegas, NV (US)

(73) Assignee: SHARON MARELLO, Glen Ellyn, IL (US)

( * ) Notice: Subject to any disclaimer, the term of this patent is extended or adjusted under 35 U.S.C. 154(b) by 1033 days.

(21) Appl. No.: 17/062,606

(22) Filed: Oct. 4, 2020

(65) Prior Publication Data

US 2021/0219635 A1     Jul. 22, 2021

Related U.S. Application Data

(60) Provisional application No. 62/973,482, filed on Oct. 4, 2019.

(51) Int. Cl.

| | |
|---|---|
| *A41D 13/015* | (2006.01) |
| *A42B 3/06* | (2006.01) |
| *A42B 3/12* | (2006.01) |
| *F16F 1/12* | (2006.01) |
| *F16F 7/01* | (2006.01) |
| *F16F 13/00* | (2006.01) |

(52) U.S. Cl.
CPC .......... *A41D 13/0153* (2013.01); *A42B 3/064* (2013.01); *A42B 3/12* (2013.01); *F16F 1/122* (2013.01); *F16F 7/01* (2013.01); *F16F 13/005* (2013.01)

(58) Field of Classification Search
CPC .. A41D 13/0153; A41D 13/05; A41D 13/015; A42B 3/064; A42B 3/12; F16F 1/122; F16F 7/01; F16F 13/005; F16F 3/04
See application file for complete search history.

(56) References Cited

U.S. PATENT DOCUMENTS

| | | | | |
|---|---|---|---|---|
| 4,213,202 | A * | 7/1980 | Larry | A41D 31/285 |
| | | | | 2/463 |
| 4,307,471 | A * | 12/1981 | Lovell | A42B 3/12 |
| | | | | 2/425 |
| 4,642,814 | A | 2/1987 | Godfrey | |
| 5,204,998 | A * | 4/1993 | Liu | A42B 3/124 |
| | | | | 2/425 |
| 6,253,376 | B1 | 7/2001 | Ritter | |
| 9,314,060 | B2 | 4/2016 | Giles | |
| 9,388,873 | B1 * | 7/2016 | Phipps | A43B 13/181 |
| 11,641,904 | B1 * | 5/2023 | Leon | A42B 3/064 |
| | | | | 2/411 |

(Continued)

FOREIGN PATENT DOCUMENTS

| | | |
|---|---|---|
| EP | 2095054 B1 | 1/2011 |

*Primary Examiner* — Khaled Annis

(57) ABSTRACT

Multi-genre body armor comprising an external coil shock suspension (500) having a plurality of coil springs (510) attached to a top shell (500b) of rigid material and a bottom shell (500a) of rigid material; an internal coil shock suspension (511) having a plurality of coil springs (510) attached to a top shell (511c) of rigid material and a bottom shell (511b) of rigid material; and an innermost layer of encased (516a) buckwheat hull shock absorbers (516), with or without a sizing sir pocket (526) sandwiched between the internal coil shock suspension (511) and the encased (516a) buckwheat hull shock absorbers (516).

8 Claims, 7 Drawing Sheets

(56)        References Cited

U.S. PATENT DOCUMENTS

| | | | | |
|---|---|---|---|---|
| 2011/0030549 A1* | 2/2011 | Mueller | ................ | F01B 3/0041 |
| | | | | 92/12.2 |
| 2012/0198604 A1* | 8/2012 | Weber | ................... | A42B 3/064 |
| | | | | 2/410 |
| 2013/0185837 A1* | 7/2013 | Phipps | ................ | A42B 3/0453 |
| 2014/0173810 A1* | 6/2014 | Suddaby | ............... | A42B 3/326 |
| 2014/0208486 A1* | 7/2014 | Krueger | ................ | A42B 3/064 |
| | | | | 2/414 |
| 2015/0047109 A1* | 2/2015 | Grant | ..................... | A42B 3/125 |
| 2015/0052669 A1* | 2/2015 | Yoon | .................... | A41D 13/015 |
| 2015/0143617 A1* | 5/2015 | Suddaby | ................ | A42B 3/124 |
| | | | | 2/414 |
| 2015/0208751 A1* | 7/2015 | Day | ....................... | A42B 3/124 |
| 2016/0029730 A1* | 2/2016 | Day | ....................... | A42B 3/064 |
| | | | | 2/412 |
| 2016/0278470 A1* | 9/2016 | Posner | .................. | A42B 3/064 |
| 2016/0316847 A1* | 11/2016 | Weber | ................... | A42B 3/064 |
| 2017/0143054 A1* | 5/2017 | Yoon | ........................ | A42B 3/32 |
| 2017/0232327 A1* | 8/2017 | Kuntz | ................... | A42B 3/125 |
| 2018/0000186 A1* | 1/2018 | Brown | ................... | A42B 3/064 |
| 2018/0228239 A1* | 8/2018 | Day | ....................... | F16F 1/126 |
| 2018/0271198 A1* | 9/2018 | Ku | ........................ | A42B 3/064 |
| 2019/0133235 A1 | 5/2019 | Domanskis | | |
| 2019/0328073 A1* | 10/2019 | Morgan | ................ | A42B 3/124 |
| 2020/0146385 A1* | 5/2020 | Young | ................... | A42B 3/064 |
| 2020/0187581 A1* | 6/2020 | Roundtree | ............. | A42B 3/08 |
| 2021/0045487 A1* | 2/2021 | Weber | ................... | A42B 3/064 |
| 2021/0219635 A1* | 7/2021 | Pascua | ..................... | F16F 3/04 |

* cited by examiner

3511

3511b

3530bis

4516a

4500

4500a

4511c

4500b

4511b

4500c

4511a

4538C

4516

4501A

4588bis

4502B

4800A

4588

4502a

4502b

MULTI-GENRE HEAD ARMOR WITH DUAL COIL SHOCK SUSPENSION AND BUCKWHEAT HULL SHOCK ABSORBERS

CROSS-REFERENCE TO RELATED APPLICATIONS

This application claims the benefit of provisional patent application Ser. No. U.S. 62/973,482 filed 2019 Oct. 4 by the present inventor.

TECHNICAL FIELD

The present invention relates to head armor, and more specifically to shock diminishing armor for the protection of the human or animal head from the effects of blunt force impact and other moving forces of energy.

| US Patents | | | |
|---|---|---|---|
| Patent Number | Kind Code | Issue Date | Patentee |
| 9,314,060 | B2 | 2016 Apr. 19 | Giles |
| 6,253,376 | B1 | 2001 Jul. 03 | Ritter |
| 4,642,817 | B1 | 1981 Feb. 17 | Godfrey |
| U.S. patent application Publications | | | |
| Publication Nr. | Kind Code | Publ. Date | Applicant |
| 20190133235 | A1 | 2019 May 09 | Domanskis |

| Foreign Patent Documents | | | | |
|---|---|---|---|---|
| Foreign Doc. Nr. | Cntry. Code | Kind Code | Pub. Date | App. Patentee |
| 2095054 | EP | B1 | 2011 Jan. 26 | Muller |

Head armor comes in a multitude of designs for a multitude of genres. For use in sports, most head gear comprises foam and an external shield of sort. Some, like THE VICK helmet, use foam with controlled air and a shield of sort.

Foam, density irrelevant, with or without use of air, is only capable of inadequate shock absorption from blunt force, and at best, merely comforts the skin upon impact from an outside force. Laceration, contusion, and concussion can and regularly do still occur.

Some head armor comprises a shield with little-to-no foam and no air. This gear includes, but is not limited to, hard hats used on construction sites; and batting helmets used in baseball.

More advanced helmets comprise foam and a single layer of collapsible devices, however the shell or shroud containing the devices is directly joined to the stationary member which rests against the body of the wearer, therefore upon impact of blunt force, there is still a jarring effect to the body of the wearer, and shock trauma is then assumed.

Recently under development at Berkeley is a helmet comprising foam and struts, however a strut is a rod, with a determined length, thus cannot direct, nor buffer movement beyond that length. As such, any force causing movement beyond that length will have a jarring effect to the body of the wearer, and shock trauma will be assumed.

Even in designs of head armor comprising a single layer of collapsible devices also serving as joinders, is the inevitable reaction of blunt force impact to the external surface, of kickback to the stationary member which rests against the head of the wearer, thus inflicting shock trauma.

Of these designs above are those Claimed in U.S. Pat. No. 9,314,060 to Giles (2016), 6253376 to Ritter (2001), and Provisional Patent Application 62/565,097 to Domanskis, having a single layer of collapsible devices; and in U.S. Pat. No. 4,642,814, to Godfrey, and European Patent 2,095,054 to Muller, having only the foam.

Although improvements to head armor have been developed throughout history these common, yet unrealized defects have gone unsolved and without correction, and presently remain.

For this reason, and others, head armor manufactured to date, everywhere In the world, Is ineffectual. IF its whole purpose I to protect the head of the wearer from injury caused by blunt force impact, yet the wearer is injured by blunt force Impact, to the areas armored, it does not work.

SUMMARY

In accordance with one embodiment, head armor comprises a dual coil shock suspension, buckwheat hull shock absorbers, and a durable, lightweight shield or encasement in every gear piece for every genre.

Advantages

Accordingly several advantages of one or more aspects are as follows: to provide a head armor that is hyper-focused on shock absorption; that protects the head of humans.

Animals, from all effects of blunt force impact; that eliminates transferred shock residuum to the body of the wearer; that allows multidirectional movement of the two external layers, independent of each other, and independent of the internal layer; that offers equal protection to all wearers without the need for sensor research and different engineering for different uses or wearers; that is lightweight, durable, and comfortable; that allows for quick and easy do-it-yourself parts repair or replacement; that allows the wearer to customize protection and comfort by adding or removing buckwheat hulls; that allows airflow and releases heat; and to provide head armor that is long-lasting and economical. Still further advantages will be elucidated upon examination of the following description and correlative drawings.

DRAWINGS—FIGURES

Suffixation has been arranged for easy recognition of categorical grouping patterns.

FIG. 3 shows a side perspective view of a threaded gabion and threaded cincture.

DRAWINGS—REFERENCE NUMERALS

Figure 1:
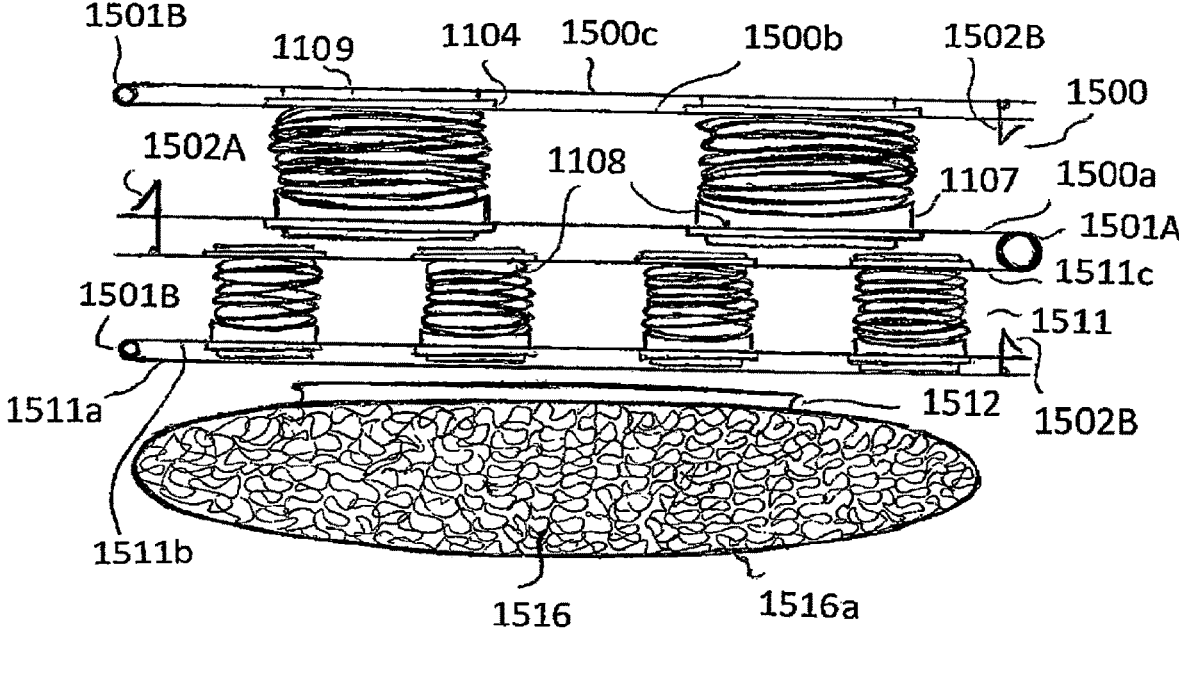
FIG. 1 shows a side elevation of the internal elements of a body armor with a dual coil shock suspension, having an independent encasement of buckwheat hull shock absorbers.

101 male threads
102 threaded gabion
103 cross-grooves
104 threaded cincture
105 wormhole
106 female threads
107 gabion
108 aperture
109 threaded cap with cross-grooves
500 bed of coil springs for external coil shock suspension
500a internal ply of the bottom shell of the external coil shock suspension
500b internal ply of the top shell of the external coil shock suspension
500c external ply of the top shell of external coil shock suspension
501A hinge
501B hinge
502A side squeeze buckle
502B side squeeze buckle
503 nubbin aperture
503A nubbin
507A chin strap loop
507B chin strap loop
510 coil spring
510ac connector shell
510e first painted line on coil spring
510f second painted line on coil spring
510g painted tip on coil spring
510h unpainted tip on coil spring
511 bed of coil springs for the internal coil shock suspension
511a external ply of the bottom shell of the internal coil shock suspension coil shock suspension
511b internal ply of the bottom shell of the internal coil shock suspension coil shock suspension
511c internal ply of the top shell of the internal coil shock suspension coil shock suspension
511II—a fastener loop
512 suspension loop
514 fastener loop
516 buckwheat hull shock absorbers
516a encasement for buckwheat hull shock absorbers
518 face mask
525 ratchet suspension
525A tension dial

528A—a female snaps
528A—b male snaps
530bis internal ventilation aperture
538 sunshade
530 external ventilation aperture
538A sunshade
588 external dome
588bis internal dome The second ply (500b) is the top shell through which a plurality of coil springs (510) is attached, at one end of each coil spring (510) by insertion through a predetermined placement and number of apertures (108).

The opposite end of each coil spring (510) is attached to its bottom shell (500a) by insertion through a predetermined placement and number of apertures (108). Each end of each coil spring (510) is secured in place with a gabion (102) and cincture (104), both having female threads (106), and a cap (109) having a wormhole (105), male threads (101), and topside cross-grooves (103).

The external bed of coil springs (500) is open and unattached along its entire perimeter.

Method and means for construction of the first bed of coil springs (500) is repeated for the second bed of coil springs (511).

The third layer of this ternary is the innermost layer of shock absorption, comprising a sufficiency of encased (516a) buckwheat hulls (516), to eliminate transferred shock residuum to the body of the wearer.

In one embodiment, the innermost layer (516) is attached by inserting the second ply of the bottom shell (511a) of the second bed of coil springs (511), through a loop (512) in the buckwheat hull encasement (516a), then securing the loop (512) between the two plies.

Of the bottom shell by a securing device, such as a side squeeze buckle (502B), at the end opposite the hinge (501B).

I contemplate the use of side squeeze buckles (502) as means for securing and opening the two plies of each shell, however, other securing devices can be used, such as snaps, ball-in-socket devices, et al.

In one or more embodiments, a predetermined size, placement and number of ventilation apertures (530, 530bis) pierce some or each and every shell of the armor.

Operation—FIG. 1

In operation, the body armor is used and works in the following ways:

Upon blunt force impact, the external layer of the ternary (500) twists, pulis, or extends in whichever direction the blunt force is travelling. Moving with and in the direction of the force, harmoniously, reduces transferred shock residuum to the next layer.

(b) Upon blunt force impact, the second layer of coil shock suspension (511) twists, pulls, or extends in the opposite directions as the external layer (500), eliminating kickback, keeping the force from jarring the body of the wearer, and absorbing the transferred shock residuum from the external layer (500).

(c) The innermost layer of buckwheat hull shock absorbers (516) is disposed between the internal coil shock suspension (511) and the body of the wearer, protecting the body of the wearer from transferred shock residuum.

Figures 7, 8:
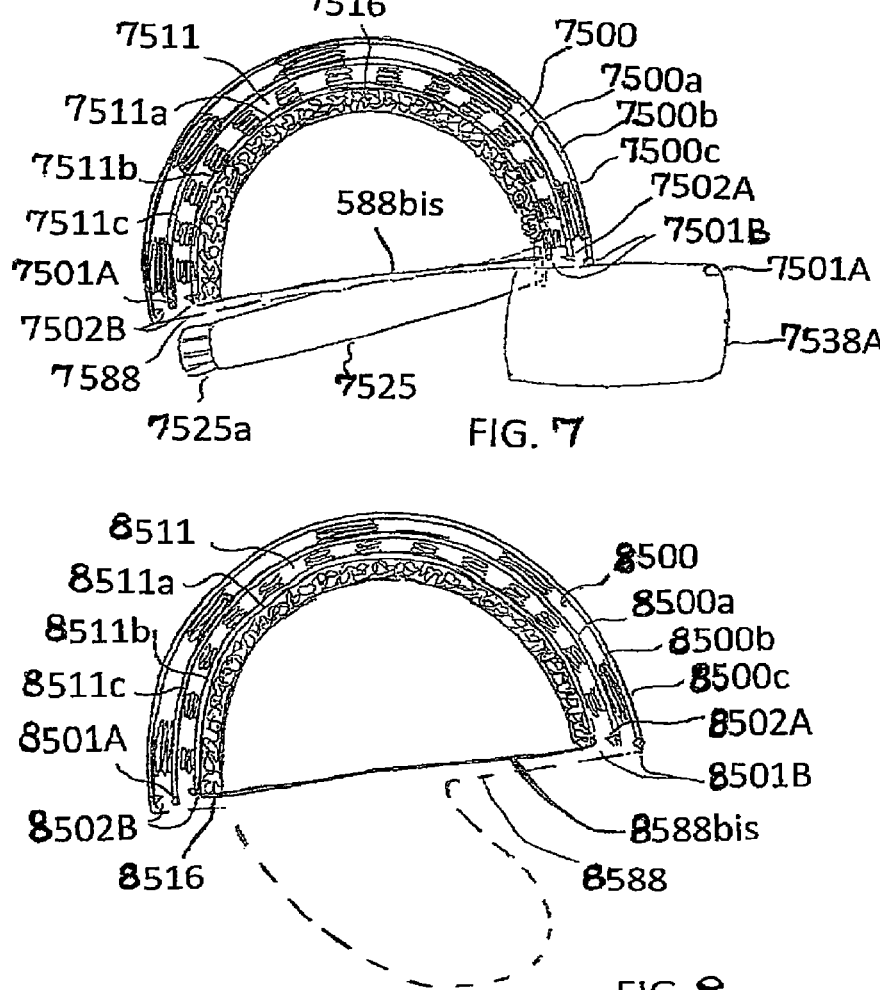
FIG. 7 shows a two-dimensional side perspective view of the body armor of FIG. 1, in the form of a hard hat for use in construction, et al.
FIG. 8 shows a two-dimensional side perspective view of the body armor of FIG. 1, in the form of a batting helmet.
Figures 9, 9A, 9B:
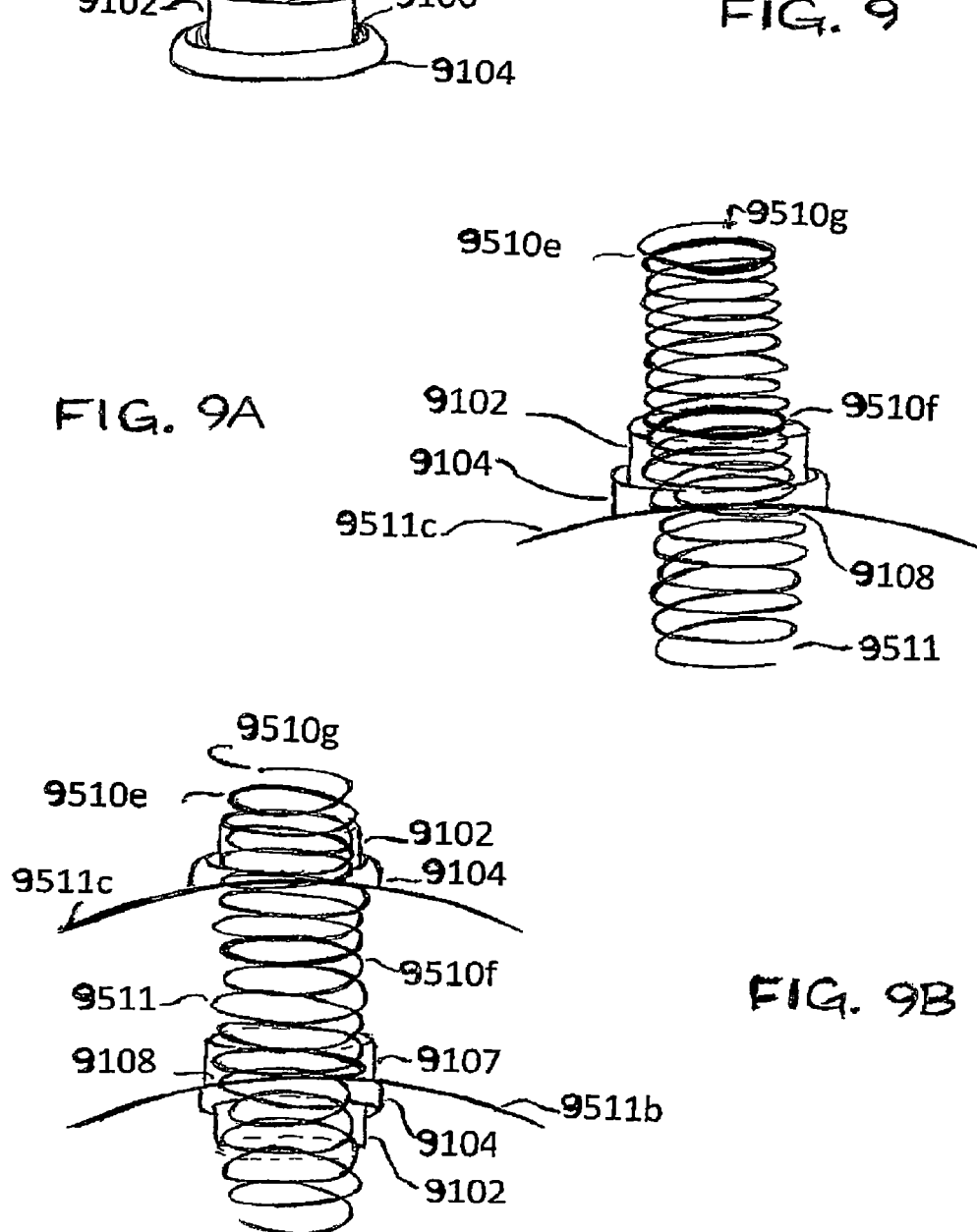
FIG. 9A shows a two-dimensional side perspective view of the gabion of FIG. 9, with coil spring insertion through one ply.
FIG. 9B shows a two-dimensional side perspective view of the gabion of FIG. 9, with coil spring insertion through two plies.
Figures 9C, 9D, 9E, 9F:
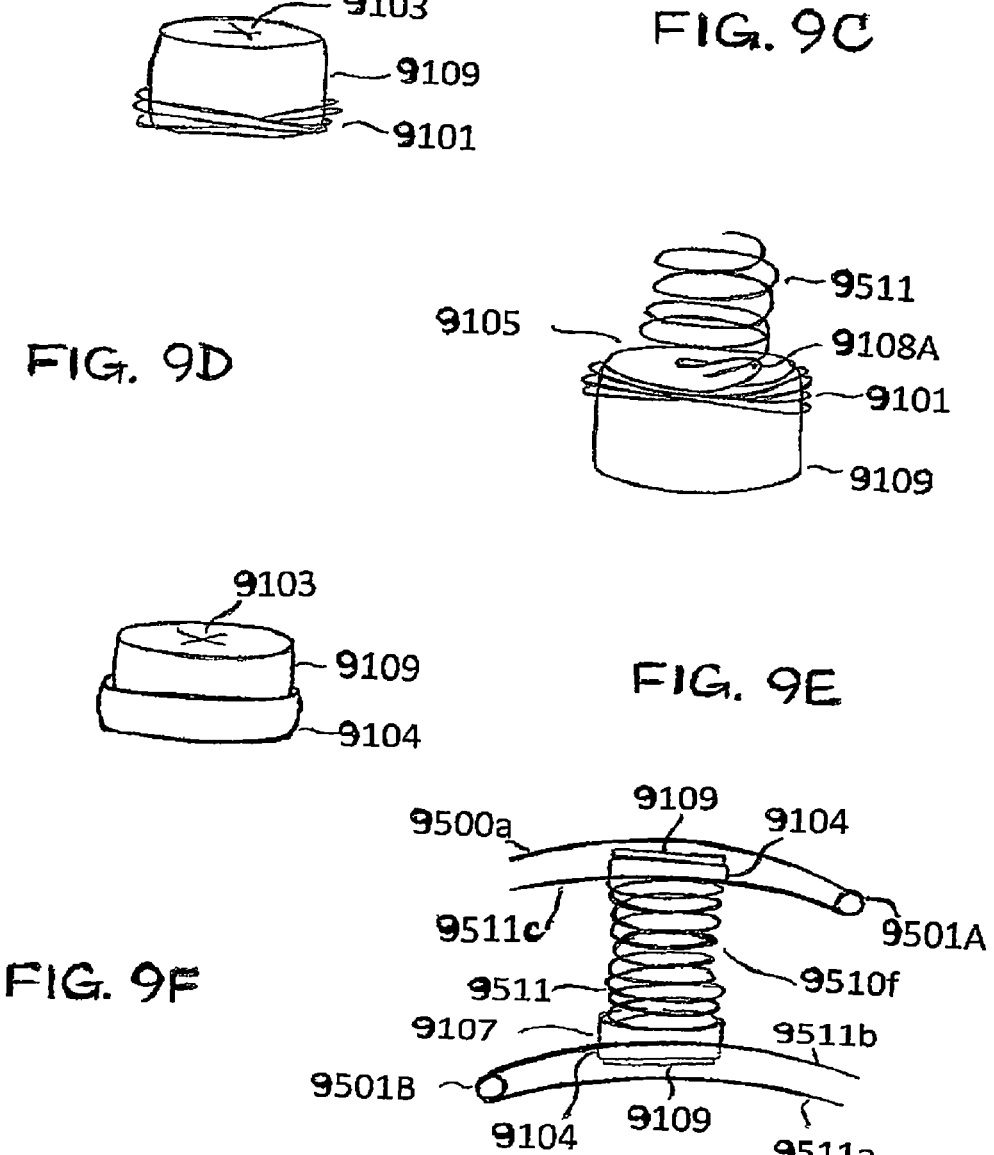
FIG. 9C shows a side perspective view of a threaded gabion cap with topside cross-grooves.
FIG. 9D shows an upside-down side perspective view of the gabion cap of FIG. 3c, with internal wormhole and coil insertion.
FIG. 9E shows a side perspective view of the gabion cap of FIG. 9C, screwed into the gabion cincture of FIG. 9.
FIG. 9F shows a two-dimensional side perspective view of the coil spring of FIG. 9A fully attached to hinged, two-ply shells at both ends.

2. One attaches the detachable body armor (FIG. 7—side elevation) to a surface of a garment with use and means for attachment, such as hook-and-loop fasteners (800), laces (111), et al, as with the protection panels (27'-888) of FIGS. 7f-7n').

3. One shapes the armor (FIGS. 1, 4, 5, and 7—side elevations; 6-6e—two-dimensional side perspectives; 7f-7n—front elevations; 7g-7n'—rear elevations) into any design, while keeping intact its fundamental elements; e.g. helmet; protection panel; chin guard; knee pad and elbow pad all with differing sizes, shapes, and design, however comprising the same elements, being the stratified disposition of an external dual coil shock suspension (588) and an internal encasement of buckwheat hull shock absorbers (516).

Operation of every design works in the manner described in FIG. 1, numbers 1(*a*)-1(*c*).

4. Other suitable manners of incorporating the stratified disposition of an external dual coil shock suspension (588) and an internal encasement of buckwheat hull shock absorbers (516), with or without sizing air pocket (526) can be used.

Operation of any manner of incorporating the stratified disposition of the fundamental elements aforementioned works in accordance with description for FIG. 1, numbers 1(*a*)-1(*c*).

Advantages

Upon examination of the description and figures, further advantages of my head armor with a dual coil shock suspension and buckwheat hull shock absorbers are elucidated.

4. Other suitable manners of incorporating the stratified disposition of an external dual coil shock suspension and buckwheat hull shock absorbers, can be used.

Operation of any manner of incorporating the stratified disposition of the fundamental elements aforementioned works in accordance with description for FIG. 1, numbers 1(*a*)-1(*c*).

Advantages

Upon examination of the description and figures, further advantages of my head armor with a dual coil shock suspension (588) and buckwheat hull shock absorbers (516) are elucidated.

b) Because I contemplate each coil spring being inserted by hand, and not machine, the manufacturing of my body armor will create employment opportunity around the world, contributing to personal, local, and global economic growth.

c) Knowing they are well-protected will enhance a wearer's performance in both work and play.

d) My body armor provides equal protection to every economical class of wearer, and while each brand might fluctuate pricing, the same armor can be made and sold to lower, middle, and upper class consumers all the same, and all around the world.

e) Having ventilation apertures piercing some or every shell of the body armor allows airflow, releases heat, reduces the weight of the armor significantly, and reduces production costs, which in turn reduces the consumer price index.

h) Reduces bulk, which allows for lighter weighted armor, which in turn, increases speed, freedom of mobility, and greater precision in the execution of activities performed by the wearer.

i) Because buckwheat hulls do not retain heat, my head armor eliminates the problem of overheating the wearer during excessive activity.

Figure 2:
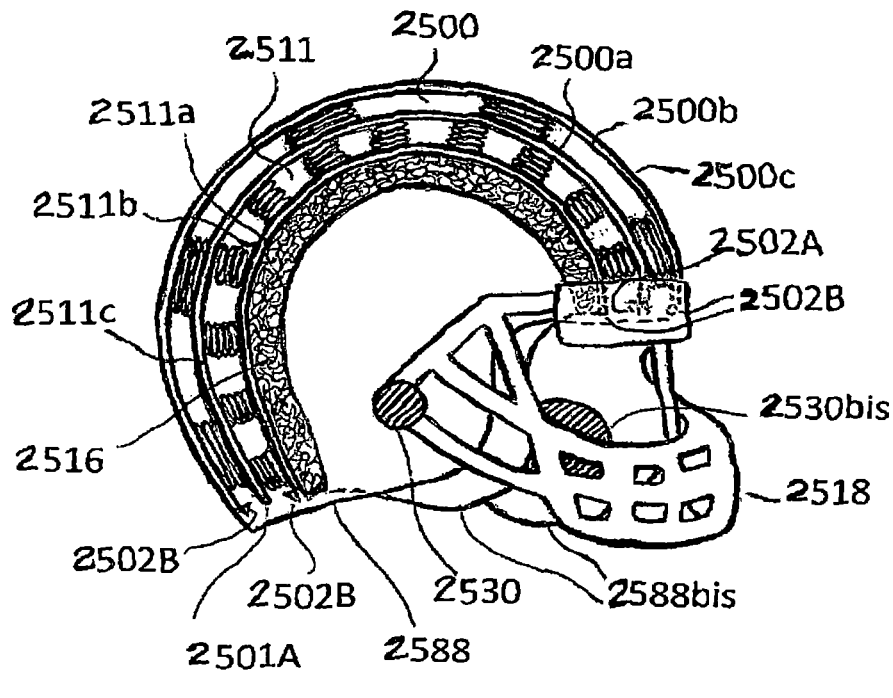
FIG. 2 shows a two-dimensional side perspective view of the body armor of FIG. 1, in the form of a football helmet.
Figures 3, 4:
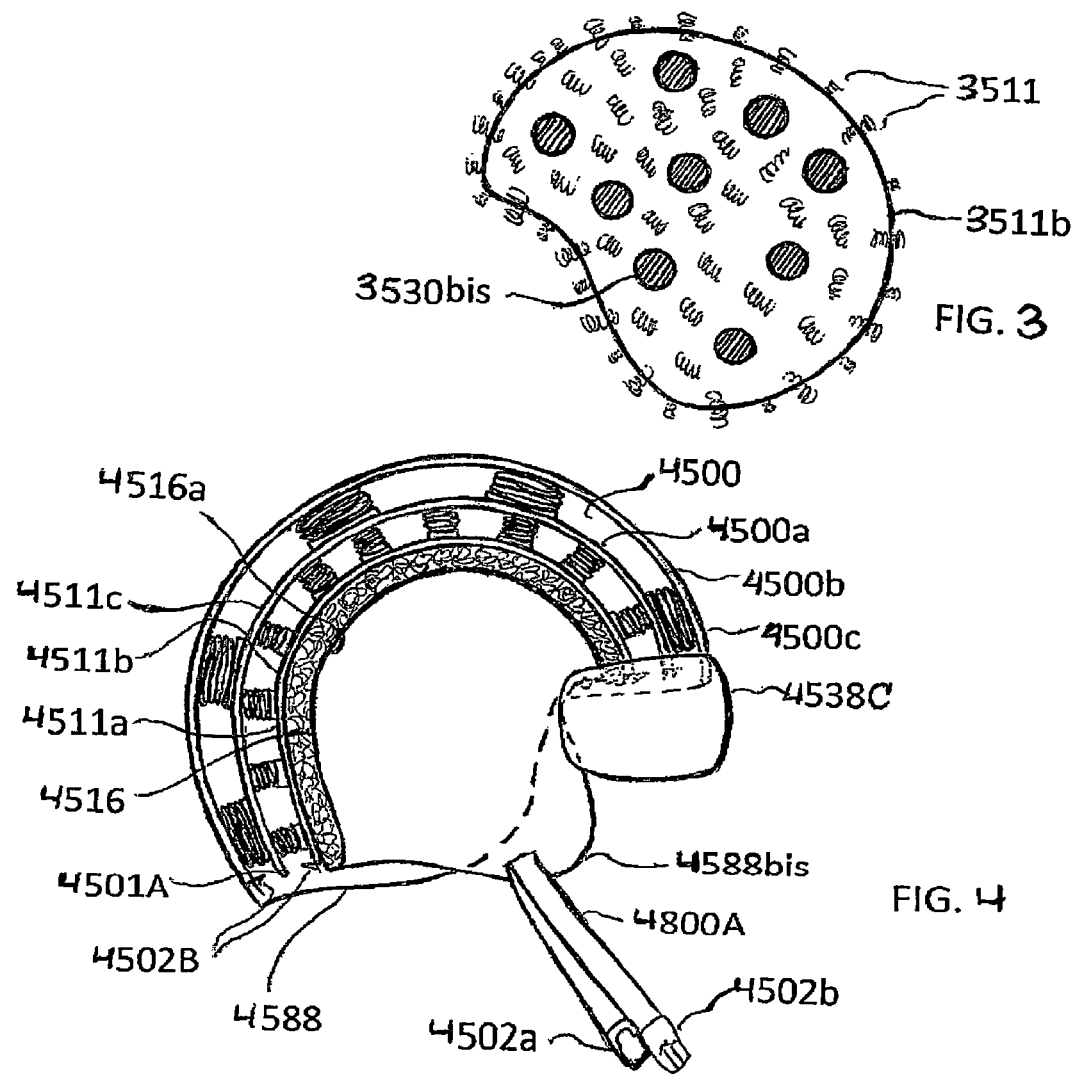
FIG. 3 shows a rear-to-side perspective view of the bottom shell of the internal coil suspension of FIG. 2.
FIG. 4 shows a two-dimensional side perspective view of the body armor of FIG. 1, in the form of a helmet for use in snow sports, ice sports, driving, et al.
Figures 5, 6:
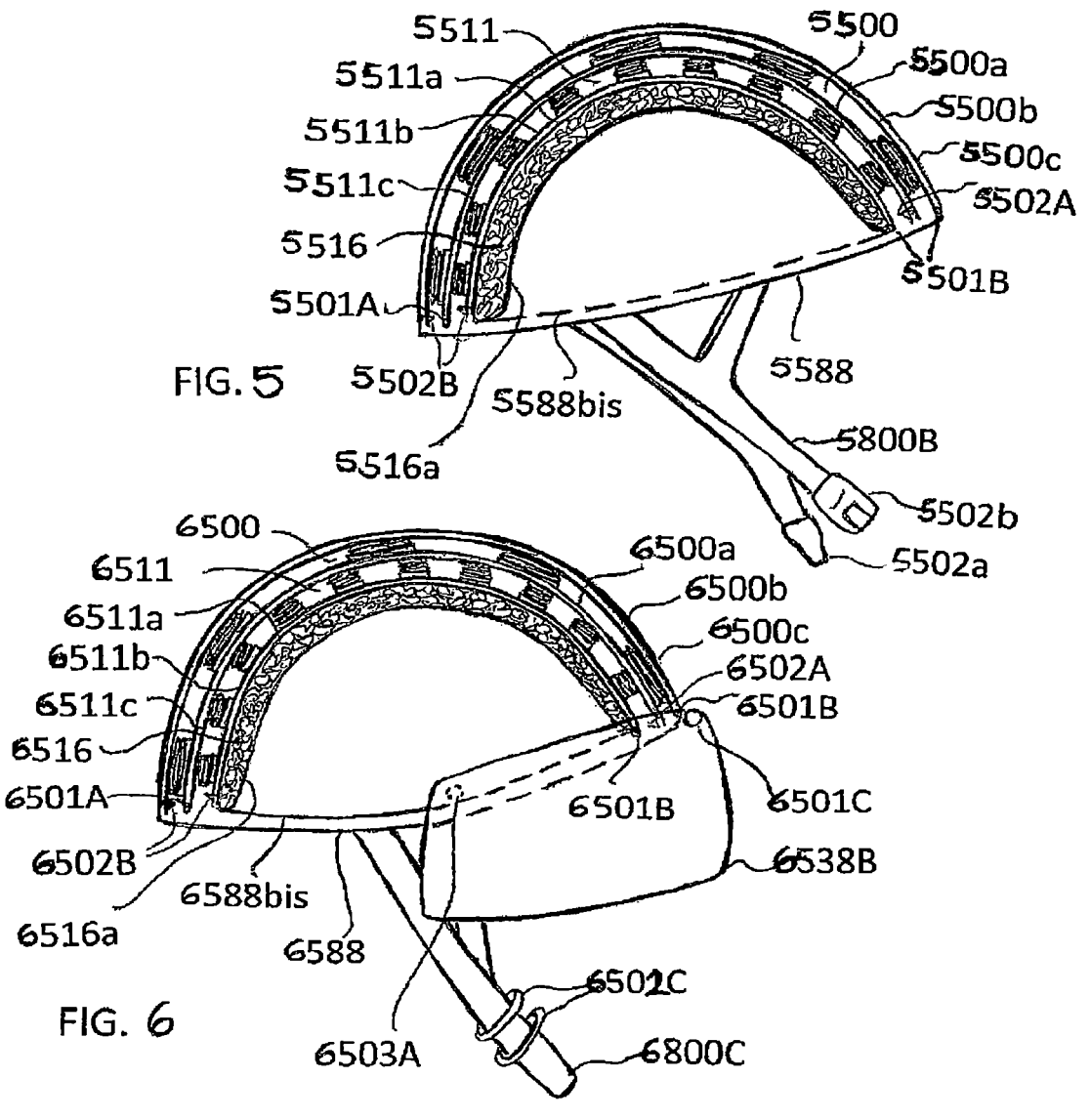
FIG. 5 shows a two-dimensional side perspective view of the body armor of FIG. 1, in the form of a multi-genre helmet.
FIG. 6 shows a two-dimensional side perspective view of the body armor of FIG. 5, in the form of a multi-genre helmet with sunshade.

FIGS. 2 and 4-5h show the body armor in additional forms of safety gear (all side elevations). FIG. 2 shows the body armor with dual coil shock suspension and buckwheat hull shock absorbers in the form of a chin guard with strap loops (507) (straps not shown). FIG. 4 shows the armor in the form of a thigh pad. FIG. 5 shows the armor in the form of both a knee pad and an elbow pad (the only distinguishing characteristic would be size). FIG. 1$d_2$ shows a compression sleeve with integrated panel pockets (012, 014), and right and left upper and lower plackets (010) for easy pull-on and off. FIG. 1$d_2$ is intended for use with FIGS. 5a and 5b show the body armor In an additional form of knee pad, having an arc with a much less pronounced curvature than that of FIG. 5. FIG. 5a shows the ternary of shock absorbers unattached, whereas FIG. 5b shows attachment, but with the securing device (502) in the open position. FIG. 5a is intended for use with garments having integrated pockets as with football uniforms (garments not shown).

FIGS. 6-6e show the body armor with dual coil shock suspension (588) and buckwheat hull shock absorbers (516) in various forms of headgear. FIG. 1f shows the armor in the form of a helmet, intended for use in snow sports and ice sports, such as snow skiing, snowboarding, and bobsledding; for use in motor sports, such as racecar driving, motorcycling, demolition derby, and go-karting; for use in aeronautical and aerial sports, such as piloting, skydiving, sky surfing, hang-gliding, and zip lining. FIG. 1g shows the armor In the form of a multi-genre helmet intended for use in sports such as bicycling, roller skating, skateboarding, lacrosse, equestrian sports, hoverboarding, scooter riding, roller derby, and rock climbing.

FIGS. 6-6e show the head armor with dual coil shock suspension (588) and buckwheat hull shock absorbers (516) in various forms of headgear. FIG. 1f shows the armor in the form of a helmet, intended for use in snow sports and ice sports, such as snow skiing, snowboarding, and bobsledding; for use in motor sports, such as racecar driving, motorcycling, demolition derby, and go-karting; for use in aeronautical and aerial sports, such as piloting, skydiving, sky surfing, hang-gliding, and zip lining. FIG. 1g shows the armor in the form of a multi-genre helmet intended for use in sports such as bicycling, roller skating, skateboarding, lacrosse, equestrian sports, hoverboarding, scooter riding, and rock climbing.

FIG. 6d shows the head armor in the form of a hard hat, with a ratchet suspension (525), intended for use on construction sites, etc. FIG. 6e shows the armor in the form of a batting helmet, intended for us in baseball and softball. FIG. 6a can be designed with no-face, half-face, or full-face styles, with or without chin straps (800), and with or without sunshades (538), all in accordance with the embodiments of FIG. 1.

FIG. 6d shows the armor in the form of a hard hat, with a ratchet suspension (525), intended for use on construction sites, etc. FIG. 6e shows the armor in the form of a batting helmet, intended for use in baseball and softball. FIG. 6a can be designed with no face, half-face, or full-face styles, with or without chin straps (800), and with or without sunshades (538), all in accordance with the embodiments of FIG. 1.

FIG. 6 show the body armor with dual coil shock suspension (588) and buckwheat hull shock absorbers (516) in the form of a football helmet. FIG. 6$_2$ shows the internal ply of the bottom shell of the second bed of coils springs (511b) with ventilation apertures (530bis). FIG. 2c shows the armor in the form of a multi-genre helmet. Options for chin straps (800), and sunshades (538) vary. FIGS. 6 and 6c are in accordance with the embodiments of FIG. 1. FIGS. 6 and 6c can be designed with or without chin straps (800) and with or without sunshades (538). FIG. 2a can be designed with various styles of facemasks (518).

I contemplate sunshades (800) for all headgear made with High Definition visual technology; light and darkness intelligence; anti-glare and antl-haze technology, and even with prescription lenses. All sunshades for all headgear can be styled in different sizes for varying coverage capabilities.

I contemplate chin straps (800) made with a non-stretch material, for use with an internal dome (588bis), or a stretch material, for use with an external dome (588), and with varying buckling devices (502).

I contemplate a comfort lining (536), a detachable, Interchangeable accessory is optional for all gear pieces, made with cooling memory foam, fur, wool, and warming technology, et al, in various shapes and sizes relevant to the gear.

FIGS. 2 and 4-7n', in use, work and operate in accordance with Operation for FIGS. 1, numbers 1(a)-1(c), and 3 above.

In operation, FIG. 2 works in the following ways:

FIGS. 3-3f show method and means for coil spring (510) attachment, for each suspension (500, 511).

Components for the method and means for coil spring (510) attachment, for each suspension are as follows:

Coil springs (510) having two painted lines (510e-510f) with predetermined placement, and a painted tip (510g).

A top shell (500b, 511c) and a bottom shell (500a, 511b), each having a predetermined placement and number of apertures (108), encircled, off center, on the external surface with a gabion (102) and cincture (104), both having female threads (106), with shell-A having no internal gabion (107), and shell-B having an encircling, off center gabion (107) on its internal surface.

FIGS. 3-3f show method and means for coil spring (510) attachment, for each suspension (500, 511).

Components for the method and means for coil spring (510) attachment, for each suspension are as follows:

Coil springs (510) having two painted lines (510e-510f) with predetermined placement, and a painted tip (510g).

A top shell (500b, 511c) and a bottom shell (500a, 511b), each having a predetermined placement and number of apertures (108), encircled, off center, on the external surface with a gabion (102) and cincture (104), both having female threads (106), with shell-A having no internal gabion (107), and shell-B having an encircling, off center gabion (107) on its internal surface.

Gabion caps (109) having an internal wormhole (105) with aperture (108A) at the tip, male threads (101), and cross-grooves (103) on top for screwing purposes.

Operation—FIGS. 3-3f

The painted tip (510g) of a coil spring (510) is inserted through an aperture (108) of shell-A, from the internal surface, by rotational ingress to the external surface until the second painted line (510f) is emergent beyond the rim of the external threaded gabion (102). This action is repeated until coil springs (510) have been inserted into all apertures (108).

Internal surfaces of shell-A, for both suspensions, are aligned in a position to the internal surfaces of shell-B, with each internal gabion (107) supporting an opposing unattached end of coil spring (510).

From the external side of shell-A, each coil spring (510) is then receded, by rotational egress, to the first painted line (510e), which causes the rotational ingress of the unpainted tip (510h) of the coil spring (510) into shell-B.

Each tip (510g, 510h) of coil spring (510) is inserted into the aperture (108A) of the wormhole (105), and each cap (109) is screwed into the cincture (104), by hand then tightened with a screw driving device, resulting in coil springs (510) suspending from one shell, and the other shell suspending from coil springs (510).

Upon completion of coil spring (510) attachment for both suspensions, the internal plies of each shell (500a, 500b, 511c) are joined by hinge (501) or other joining device with swivel capabilities at one end, to the external ply of each shell (500a, 500c, 511a), and secured in place, at the opposite end, by a side squeeze buckle with hinge (502), or other latching device of suitability.

An inverted order of suspension is as follows:

A bed of coil springs (511) suspended from a stationary shell (511b).

A second shell (511c) suspending from the suspended bed of coil springs (511).

A second bed of coil spring (500) suspending from the second shell.

A third shell (500b) suspending from the suspended second bed of coil springs (500).

Advantages

From the description and figures provided, several advantages of my various embodiments become evident:

(a) An optional comfort ling (536) is inclusive with every gear piece; the independent, detachable accessory, the disposition of which is rested between the head of the wearer and the encasement of buckwheat hull shock absorbers (516) and having the technology and intelligence for the purposes of cooling, warming, and comforting.

(b) An optional sunshade (538) is inclusive with head pieces, having High Definition properties, light and darkness intelligence, anti-glare and anti-haze technology, and other properties eliminating the problem of decompensated vision in inclement weather and other conditions which tend to visually impair. Vision options on sunshades (538) include corrective prescriptions, which will obviate the need for wearers to don eyeglasses with headgear.

FIG. 7n', in use, work and operate in accordance with Operation for FIG., numbers 1(a)-1(c), above.

Advantages

Accordingly, several more advantages of the body armor with dual coil shock suspension and buckwheat hull shock absorbers in the form of protection panel (27-89) for use with a stratified garment are as follows:

(a) It allows the wearer to be the architect, choosing each panel (27-89), and each placement, customizing each garment (100) to individual preference.

Conclusions, Ramifications, and Scope

Accordingly, the examiner will see that the various embodiments of my body armor solve and correct every defect plaguing body armor, historically and to date, as elucidated in the BACKGROUND, particularly identifying and addressing the conceptual defect which continues to cause inventors and manufacturers to produce body armor engineered to protect the body armor more so than the wearer.

Permitting quick, easy, and repeated, if necessary, parts repair or replacement I not only economical for the consumer and parts manufacturers, but bears quite the advantage for athletes who are superstitious about their gear pieces bringing luck or greatness in performance and play. An athlete can use his or her lucky gear piece for life, and the armor will maintain effectiveness.

Providing equal protection to every consumer, regardless of size, weight, age, gender, or economic class.

Dispositions, sizes, quantities, shapes, etc. of features such as apertures, plackets, fastening devices, securing devices, coil spring coarseness

What is claimed is:

1. A body armor comprising an internal encasement of buckwheat hull shock absorbers and an external dual coil shock suspension, for the protection of the human or animal head from the effects of blunt force impact and other moving forces of energy;

wherein said dual coil shock suspension comprises an external suspension having a plurality of coil springs with a top shell of rigid material and a bottom shell of rigid material and an internal suspension having a plurality of coil springs with a top shell of rigid material and a bottom shell of rigid material;

wherein said top shell of rigid material and said bottom shell of rigid material for both said external suspension and said internal suspension each comprise two plies, having a joining device with swivel capabilities at one end and the opposite end bearing a latching device.

2. The body armor of claim 1 wherein a single shell composes both said bottom shell of said external suspension and said top shell of said internal suspension.

3. The body armor of claim 1 wherein said top shell of rigid material for both said suspensions have a predetermined placement and number of apertures.

4. The body armor of claim 3 wherein said apertures of said bottom shell are encircled, off center, with a gabion and cincture on the external surface of said top shell of each said suspension.

5. The body armor of claim 4 wherein said gabion and said cincture both have female threads.

6. The body armor claim 4 wherein a gabion cap having an internal wormhole with aperture at a tip, male threads, and topside cross-grooves screws into said gabion and said cincture.

7. The body armor of claim 3 wherein said apertures of said bottom shell have an encircling, off center gabion on an internal surface.

8. The body armor of claim 1 wherein said coil springs have two painted lines circumferentially disposed, and a painted tip proximal to said painted lines.

* * * * *